US012670874B2

(12) United States Patent
Kim et al.

(10) Patent No.: US 12,670,874 B2
(45) Date of Patent: Jun. 30, 2026

(54) DRIVING SYSTEM, DISPLAY SYSTEM, AND DISPLAY DEVICE

(71) Applicant: BEIJING XIANXIN TECHNOLOGY CO., LTD, Beijing (CN)

(72) Inventors: Jong Dae Kim, Beijing (CN); Youngjin Lim, Beijing (CN); Chenghui Yan, Beijing (CN)

(73) Assignee: BEIJING XIANXIN TECHNOLOGY CO., LTD, Beijing (CN)

( * ) Notice: Subject to any disclaimer, the term of this patent is extended or adjusted under 35 U.S.C. 154(b) by 0 days.

(21) Appl. No.: 19/104,346

(22) PCT Filed: Aug. 17, 2023

(86) PCT No.: PCT/CN2023/113599
§ 371 (c)(1),
(2) Date: Feb. 17, 2025

(87) PCT Pub. No.: WO2024/041448
PCT Pub. Date: Feb. 29, 2024

(65) Prior Publication Data
US 2026/0057852 A1 Feb. 26, 2026

(30) Foreign Application Priority Data
Aug. 22, 2022 (CN) ........................ 202211006953.X

(51) Int. Cl.
*G09G 3/32* (2016.01)
*G09G 3/34* (2006.01)
*G09G 3/36* (2006.01)

(52) U.S. Cl.
CPC ............... *G09G 3/342* (2013.01); *G09G 3/36* (2013.01); *G09G 2320/0626* (2013.01)

(58) Field of Classification Search
CPC .. G09G 3/342; G09G 3/36; G09G 2320/0626; G09G 3/3426; G09G 3/3611
(Continued)

(56) References Cited

U.S. PATENT DOCUMENTS

2007/0152926 A1* 7/2007 Kwon .................. G09G 3/3426 345/82
2007/0222744 A1 9/2007 Okita et al.
(Continued)

FOREIGN PATENT DOCUMENTS

CN 101325043 A 12/2008
CN 102314841 A 1/2012
(Continued)

*Primary Examiner* — Abdul-Samad A Adediran
(74) *Attorney, Agent, or Firm* — IPro, PLLC

(57) ABSTRACT

A driving system, a display system, and a display device are disclosed. The driving system includes a timing controller and a plurality of display drivers; the timing controller is connected to the display drivers, respectively; each display driver includes a regional dimming signal generation unit and an LED driving control unit. After the timing controller transmits a first display data packet to each display driver, the regional dimming signal generation unit in each display driver generates a corresponding backlight brightness signal according to the first display data packet, and the LED driving control unit in each display driver generates a plurality of corresponding LED driving control signals according to the backlight brightness signal, so that the display driver can also drive a backlight circuit.

13 Claims, 9 Drawing Sheets

(58) Field of Classification Search
USPC ..................................................... 345/82, 102
See application file for complete search history.

(56) References Cited

U.S. PATENT DOCUMENTS

| | | | | |
|---|---|---|---|---|
| 2011/0148748 A1* | 6/2011 | Lee | ...................... | G09G 3/3611 345/102 |
| 2021/0225298 A1* | 7/2021 | Shi | ........................... | G09G 5/10 |

FOREIGN PATENT DOCUMENTS

| | | | |
|---|---|---|---|
| CN | 102890917 | A | 1/2013 |
| CN | 107068072 | A | 8/2017 |
| CN | 107123406 | A | 9/2017 |
| CN | 108538260 | A | 9/2018 |
| CN | 110767183 | A | 2/2020 |
| CN | 115273762 | A | 11/2022 |

* cited by examiner

DRIVING SYSTEM, DISPLAY SYSTEM, AND DISPLAY DEVICE

The present application is a US National Stage of International Application No. PCT/CN2023/113599, filed on Aug. 17, 2023, which claims the priority from Chinese Patent Application No. 202211006953.X, filed with the China National Intellectual Property Administration on Aug. 22, 2022 and entitled "Driving System, Display System, and Display Device", which is hereby incorporated by reference in its entirety.

TECHNICAL FIELD

The present application relates to the display field, in particular to a driving system, a display system, and a display device.

BACKGROUND

A liquid crystal display device consists of a liquid crystal display panel, a backlight circuit, and a display system. During the imaging process of the liquid crystal display device, the display system drives the liquid crystal display panel to adjust the states of the internal imaging structure of the liquid crystal display panel based on video data, and determines the brightness information to be generated for each region of the backlight unit based on the video data. The display system drives the backlight circuit to produce the corresponding illumination, which is projected onto the liquid crystal display panel to generate the corresponding video image.

In existing display systems, driving the liquid crystal display panel and the backlight circuit requires not only a light-emitting diode (LED) controller to drive the LEDs in the backlight circuit via an LED driver but also a display driver to drive the liquid crystal display panel. This results in a complex wiring layout of the circuit structure for the display system.

SUMMARY

The present application provides a driving system, a display system and a display device, to solve the technical issue of complex wiring layout of the circuit structure corresponding to the display system.

In a first aspect, the present application provides a driving system, including: a timing controller (TCON for short) and a plurality of display drivers, and the timing controller is connected to each display driver respectively. Each display driver includes a local dimming signal generation unit and an LED drive control unit. After the timing controller transmits a first display data packet to each display driver, the local dimming signal generation unit in each display driver generates a corresponding backlight brightness signal according to the first display data packet, and the LED drive control unit in each display driver generates a plurality of corresponding LED drive control signals according to the backlight brightness signal.

In the above technical solution, by adding LED drive signals in each display driver, the LED drivers for generating LED drive control signals and related circuit structure in the existing display system are replaced, thereby reducing the wiring layout complexity of the circuit structure.

Optionally, each display driver includes a plurality of LED drive control terminals, and each LED drive control terminal outputs a corresponding LED drive control signal.

Optionally, the first display data packet includes video data and configuration parameters of each display driver; the display driver determines a processing mode of the display driver according to the configuration parameters; a dimming signal generation unit in the display driver generates the corresponding backlight brightness signal according to the video data; and the LED drive control unit in the display driver generates a corresponding LED drive signal according to the backlight brightness signal.

In a second aspect, the present application provides a display system, including a main controller, an LCD display, a backlight circuit and the driving system involved in the first aspect. The main controller is connected to the timing controller of the driving system, each LED driving control terminal of the display driver is connected to the backlight circuit, and an LCD drive signal output terminal of the display driver is connected to the LCD panel.

Optionally, the backlight circuit includes a plurality of backlight units, and the number of the backlight units is the same as the number of display drivers in the driving system.

Optionally, each backlight unit includes a plurality of groups of cascaded LED drivers, and the number of LED drive control terminals in each display driver is the same as the number of groups of cascaded LED drivers in each backlight unit.

Optionally, the display system further includes a main control board, a timing control board, a source board, at least one flexible display drive board, at least one flexible circuit board for serial transmission and a plurality of flat cables; the timing controller is connected to the timing control board, and the main controller is connected to the main control board; the LCD panel includes a plurality of LCD drive signal input interfaces. Each flexible display drive board is connected with one display driver. The main control board is connected to the timing control board through a flat cable, the timing control board is connected to the source board through a flat cable, the source board is connected to the corresponding cascade LED drivers through each flexible circuit board for serial transmission. The source board is connected to each flexible display drive board, and each flexible display drive board is connected to the corresponding LCD drive signal input interface. The number of display drivers is the same as the number of flexible display drive boards, and is the same as the number of flexible circuit boards for serial transmission.

Optionally, an LED drive control signal outputted from the LED drive control terminal of each display driver is transmitted to the corresponding cascaded LED drivers through the source board and the flexible circuit board for serial transmission.

Optionally, the display system further includes a main control board, a timing control board, at least one flexible display drive board, at least one flexible circuit board for serial transmission and a plurality of flat cables. The timing controller is connected to the timing control board, and the main controller is connected to the main control board. The LCD panel includes a plurality of LCD drive signal input interfaces. Each flexible display drive board is connected to one display driver. The main control board is connected to the timing control board through a flat cable, the timing control board is connected to the corresponding cascaded LED drivers through each flexible circuit board for serial transmission, the timing control board is connected to each flexible display drive board, and each flexible display drive board is connected to the corresponding LCD drive signal input interface. The number of display drivers is the same as the number of flexible display drive boards, and is the same as the number of flexible circuit boards for serial transmission.

Optionally, an LED drive control signal outputted from the LED drive control terminal of each display driver is transmitted to the corresponding cascaded LED drivers through the timing control board and the flexible circuit board of serial transmission.

In a third aspect, the present application provides a driving system, including: a timing controller and a plurality of display drivers, and the timing controller is connected to each display driver respectively. Each display driver includes an LED drive control unit. The timing controller includes a local dimming signal generation unit. After the timing controller transmits a second display data packet to each display driver, the LED drive control unit in each display driver obtains a backlight brightness signal from the second display data packet and generates a corresponding LED drive control signal according to the backlight brightness signal. The second display data includes the backlight brightness signal.

Optionally, the second display data packet also includes video data and configuration parameters of each display driver. The display driver determines a processing mode of the display driver according to the configuration parameters. The dimming signal generation unit in the display driver generates a corresponding backlight brightness signal according to the video data; and the LED drive control unit in the display driver generates a corresponding LED drive signal according to the backlight brightness signal.

In a fourth aspect, the present application provides a display system, including a main controller, an LCD display, a backlight circuit and the driving system involved in the second aspect. The main controller is connected to the timing controller of the driving system, the display driver is connected to the backlight circuit, and the display driver is connected to the LCD panel.

In a fifth aspect, the present application provides a display device, including the display system involved in the second aspect or the fourth aspect.

The present application provides a driving system, a display system and a display device. The driving system includes: a timing controller and a plurality of display drivers. The timing controller is connected to each display driver respectively. Each display driver includes a local dimming signal generation unit and an LED drive control unit. After the timing controller transmits a first display data packet to each display driver, the local dimming signal generation unit in each display driver generates a corresponding backlight brightness signal according to the first display data packet. The LED drive control unit in each display driver generates a plurality of corresponding LED drive control signals according to the backlight brightness signal, so that the display driver can also drive the backlight circuit. The display driver replaces the LED driver and related circuit structure that generate the LED drive control signal in the existing display system, reducing the wiring layout complexity of the circuit structure.

BRIEF DESCRIPTION OF FIGURES

The accompanying drawings, which are incorporated in and constitute a part of this specification, illustrate embodiments consistent with the present application and, together with the description, serve to explain the principles of the present application.

The above-mentioned drawings have shown specific embodiments of the present application, which will be described in more detail below. These drawings and textual descriptions are not intended to limit the scope of the present application in any way, but rather to illustrate the concept of the present application to those skilled in the art by referring to specific embodiments.

REFERENCE SIGNS

20: main controller; 21: TCON; 221: first original display driver; 222: second original display driver; 22*m*: m-th original display driver; 23: liquid crystal display (LCD) Panel; 24: backlight circuit; 25: LED controller; 26: main control board; 27: timing control board; 28: source board; 29: LED control board; 201: first local dimming signal generation unit; 211: second local dimming signal generation unit; 30: video data transmission line; 31: point-to-point data transmission line; 32: serial peripheral interface (SPI) data transmission line; 33: LED driver interface data transmission line; 34: local dimming unit; 35: third local dimming signal generation unit; 36: LED drive control unit; 37: flexible circuit board for serial transmission; 38: flexible display drive board; 391: first display driver; 392: second display driver; 39*m*: m-th display driver; 241: LED; 242: LED driver; 243: backlight unit; 244: LCD drive signal output interface; CLED-D: LED drive control interface.

DETAILED DESCRIPTION

The exemplary embodiments are explained in detail herein, with examples shown in the accompanying drawings. When the following description refers to the drawings, unless otherwise indicated, the same numbers in different drawings represent the same or similar elements. The implementations described in the following exemplary embodiments do not represent all implementations consistent with the present application. Rather, they are merely examples of apparatus and methods consistent with some aspects of the present application as recited in the appended claims.

Figure 1:
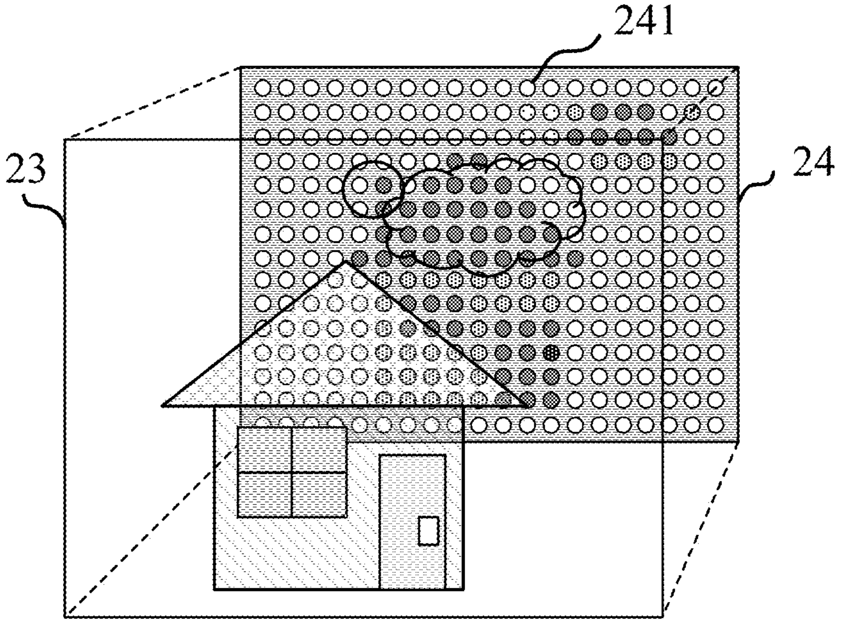
FIG. 1 is a schematic diagram of an imaging structure of a liquid crystal display device.

A liquid crystal display (LCD) device includes a display system consisting of a main controller, a driving system, and an imaging unit. The imaging unit includes a backlight circuit 24 and an LCD panel 23. The positional relationship between the backlight circuit 24 and the LCD panel 23 is shown in FIG. 1. In this figure, the backlight circuit 24 includes a plurality of LEDs 241 or mini-LEDs. The backlight circuit 24 corresponds to the LCD panel 23, with the LCD panel 23 being positioned in front of the backlight circuit 24, and provides illumination for images displayed on the LCD panel 23.

During the imaging process of the LCD device, the driving system drives the LCD panel based on video data to adjust the state of its internal imaging structure. Simultaneously, it determines the brightness information required for each region of the backlight unit based on the video data, driving the backlight unit to produce corresponding light. The backlight unit projects the light onto the LCD panel, thereby generating a corresponding video image. Each LED 241 in the backlight circuit 24 is positioned differently, and each LED 241 provides light to a corresponding liquid crystal region on the LCD panel 23. The brightness of the light is adjusted based on the video data displayed in the liquid crystal region.

Figure 2:
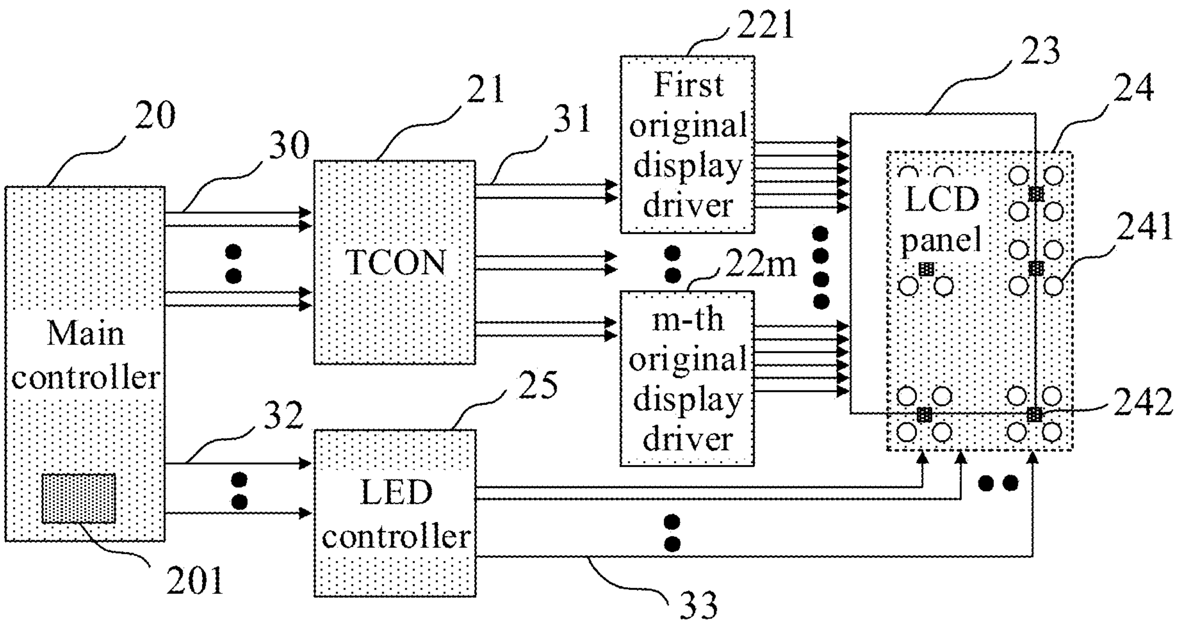
FIG. 2 is a schematic diagram of a structure of an exemplary traditional display system provided by the present application.

A traditional display system, with a schematic diagram of one structure shown in FIG. 2, includes a main controller 20, a driving system, an LCD panel 23, and a backlight circuit 24. The backlight circuit 24 includes a plurality of LEDs 241 and a plurality of LED drivers 242. The driving system includes a timing controller (TCON) 21, m original display drivers, and an LED controller 25. The main controller 20 includes a first local dimming signal generation unit 201. The m original display drivers include: a first original display driver 221, a second original display driver 222, . . . , and an m-th original display driver 22*m*. In an embodiment, the main controller 20 is a system-on-chip (SoC) or scaler chip, and the original display driver is an SDIC chip.

The main controller 20 connects to the TCON 21 via a video data transmission line 30. The TCON 21 connects to the respective original display drivers via point-to-point data transmission lines 31, and the respective original display drivers connect to corresponding drive signal input terminals on the LCD panel 23. Additionally, the main controller 20 connects to the LED controller 25 via an SPI data transmission line 32. The LED controller 25 connects to the respective LED drivers 242 in the backlight circuit 24 through LED driver interface data transmission lines 33.

On the one hand, the main controller 20 transmits video data to the TCON 21, enabling the TCON 21 to convert the video data into point-to-point differential signals that can be processed by the original display drivers 221. These signals are transmitted through point-to-point data transmission lines 31 in a high speed serial transmission mode. Upon receiving the differential signals, the original display drivers generate, based on the differential signals, corresponding LCD drive signals to drive the LCD panel 23 to adjust the internal imaging structure of the corresponding regions. In an embodiment, the point-to-point differential signals can be transmitted via an ISP interface, a CHPI interface, a USIT interface, or a CEDS interface.

Figure 3:
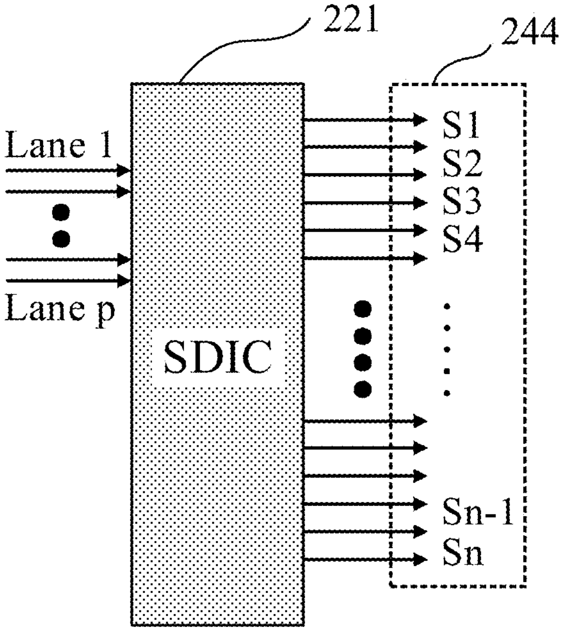
FIG. 3 is a schematic diagram of a structure of an original display driver provided by the present application.
Figure 4:
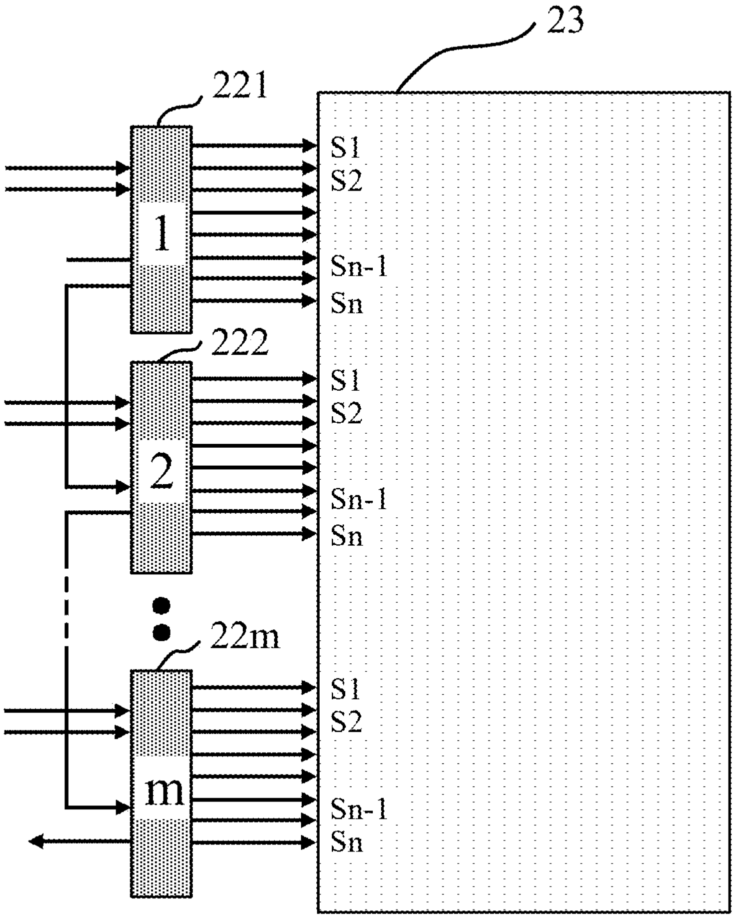
FIG. 4 is a schematic diagram illustrating connection relationships between a plurality of original display drivers and an LCD panel provided by the present application.

More specifically, the connection relationship between the original display drivers and the LCD panel 23 is shown in FIG. 4, and the schematic structure of the original display drivers is shown in FIG. 3. Along a horizontal side of the LCD panel 23, there are a plurality of signal input terminals S1, S2, . . . Sn. Here, p indicates the number of input terminals for each original display driver, m indicates the number of original display drivers, and n indicates the number of LCD drive signal output terminals in the LCD drive signal output interface 244 of each original display driver. The signal input terminals divide the LCD panel 23 into m regions along the horizontal direction of the LCD panel, with each original display driver driving the corresponding region of the LCD panel to display the corresponding image.

On the other hand, the first local dimming signal generation unit 201 generates backlight brightness signals for each region of the backlight circuit 24 based on the video data. These signals are output from the SPI interface of the main controller 20 and transmitted via the SPI data transmission line 32 to the LED controller 25. The LED controller 25 generates a plurality of control signals and transmits them to the corresponding LED drivers 242 via the LED driver interface data transmission lines 33. The LED drivers 242 drive the connected LEDs 241 to produce the corresponding light, which is then projected onto the front LCD panel 23 to display images corresponding to the video data. The LED drivers 242 are cascaded along the horizontal direction of the backlight circuit 24, meaning the LED drivers in the same row are sequentially connected. The LED driver's signal for driving the surrounding LEDs 241 is obtained from the previous LED driver close to the signal input terminal.

Figure 5:
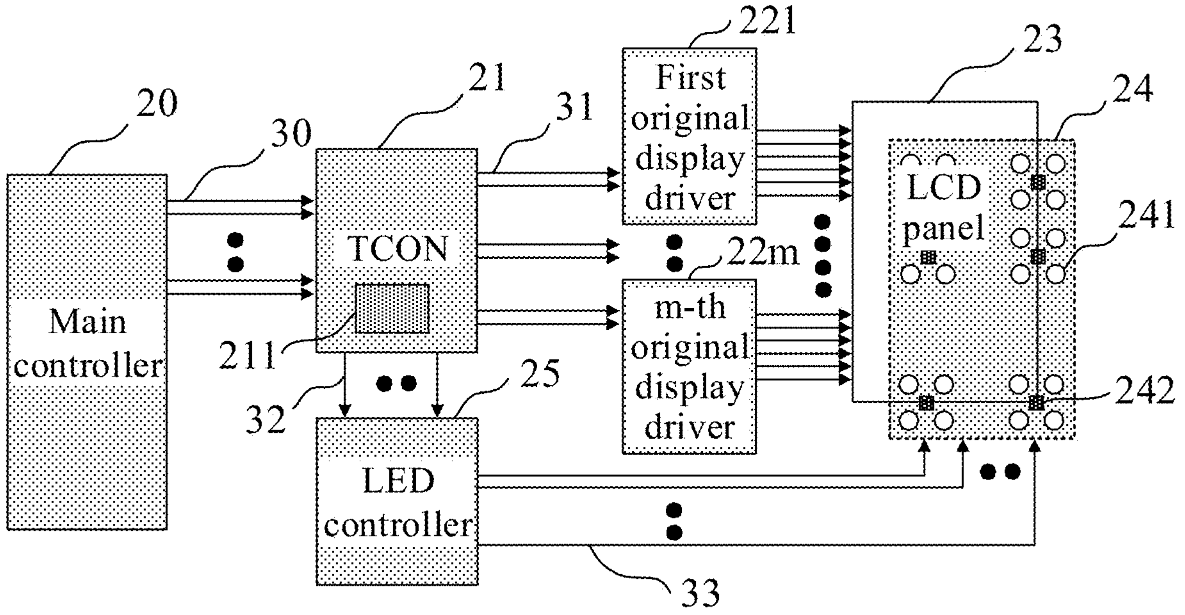
FIG. 5 is a schematic diagram of another exemplary traditional display system provided by the present application.

Likewise, another schematic diagram of a traditional display system is shown in FIG. 5. Compared to the structure in FIG. 2, the unit for generating the backlight brightness signal is no longer integrated into the main controller 20 but is integrated into the TCON 21, as the second local dimming signal generation unit 211. The TCON 21 connects to the LED controller 25 via the SPI data transmission line 32, transmitting the backlight brightness signals generated by the second local dimming signal generation unit 211 in the TCON 21 to the LED controller 25 based on the SPI protocol. The LED controller 25 generates a plurality of control signals to drive the corresponding cascading LED drivers 242 for operation.

The LCD panel 23 and the backlight circuit 24 in the above-mentioned two kinds of display systems are controlled by different controllers respectively, resulting a situation that the circuit structure is complex, and the configuration cost is also high. The display system needs staff to debug each unit in the display system separately during application, and the workload is large, and the debugging efficiency is low.

Figure 6A:
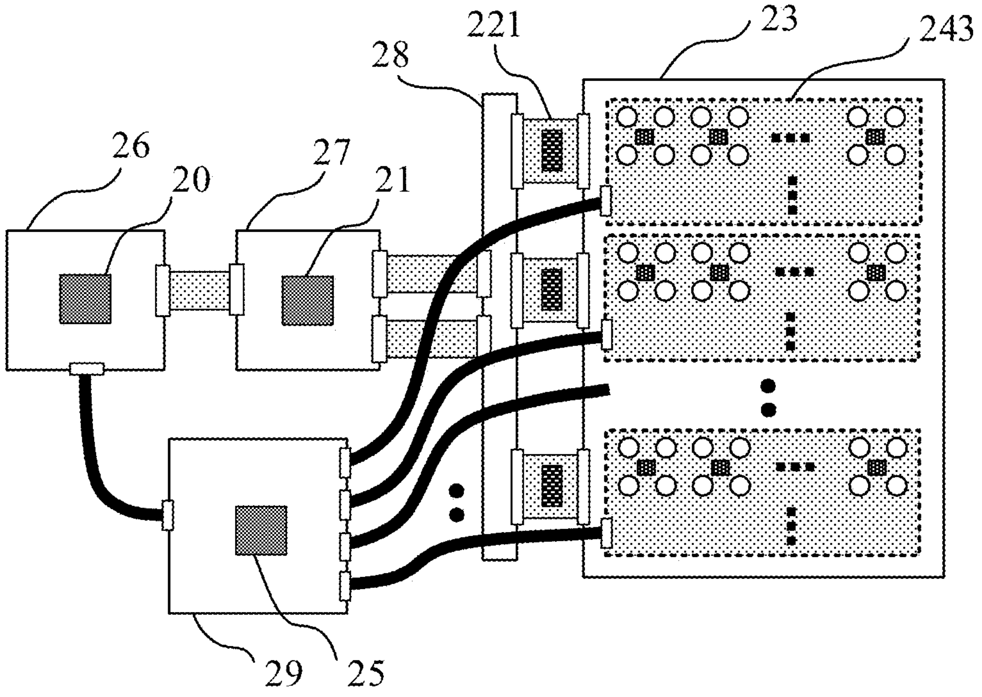
FIG. 6A is a circuit diagram of an exemplary traditional display system provided by the present application.
Figure 6B:
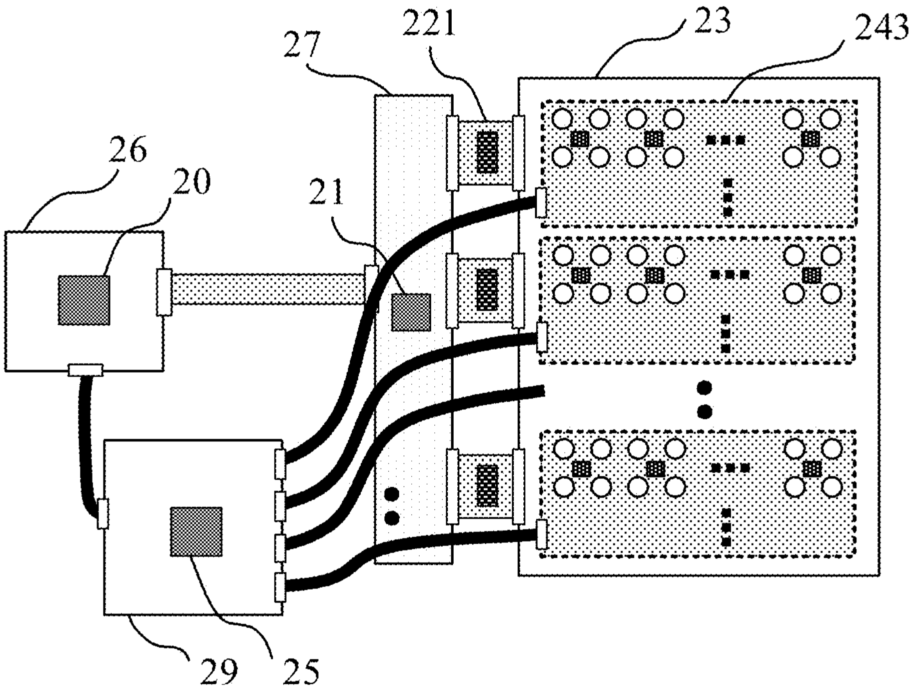
FIG. 6B is another circuit diagram of an exemplary traditional display system provided by the present application.

The specific circuit connection relationship of the above two display systems is shown in FIG. 6A and FIG. 6B. In FIG. 6A, the circuit diagram includes a main controller 20, a timing controller 21, a main control board 26, a timing control board 27, a source board 28, a plurality of original display drivers, an LCD panel 23, a backlight circuit, an LED controller 25, and an LED control board 29. A plurality of backlight units 243 are included in the backlight circuit. The plurality of backlight units 243 are placed below the LCD panel 23.

The main controller 20 is placed on the main control board 26, some or all of the pins of the main controller 20 are connected with the main control board 26, the timing controller 21 is placed on the timing control board 27, and some or all of the pins of the timing controller 21 are connected with the timing control board 27. Each original display driver is connected to a flexible display drive board 38. The LED controller 25 is placed on the LED control board 29, and some or all of the pins of the LED controller 25 are connected with the LED control board 29. The main control board 26 is connected with the timing control board 27 via a flat cable, the timing control board 27 is connected with the source board 28 via a flat cable, the source board 28 is connected with one end of each flexible display drive board 38, and the other end of the flexible display drive board 38 is connected with the corresponding LCD drive signal input interface in the LCD panel 23. The main control board 26 is also connected with the LED control board 29 via a flat cable, and the LED control board 29 is also connected with a plurality of backlight units 243 respectively.

Compared with the circuit structure of FIG. 6A, the circuit structure of FIG. 6B adopts fewer circuit boards and connection lines, and the circuit structure in FIG. 6B removes the source board 28 in FIG. 6A and the flat cable between the source board 28 and the timing control board 27, so that the timing control board 27 can be directly connected with each flexible display drive board 38.

However, in the above two circuit structures, after the main controller 20 obtains video data, the transmission paths for generating and transmitting of the drive signal for driving the backlight circuit and the drive signal for driving the LCD panel are different, easily causes the LCD panel and the backlight circuit to obtain the drive signals inconsistently, and the picture effect that the display system generates is poor. In addition, a plurality of transmission paths lead to a high degree of complexity in circuit layout.

In view of the above technical issues, the present application provides a driving system, a display system and a display device, to solve the technical issue of high complexity of circuit structure circuit layout corresponding to the display system. The technical conception of the present application is: integrating the function of the LED controller into the display driver, the display system utilizes the display driver to drive the backlight circuit and the LCD panel simultaneously to carry out image display, so that the LED controller and related wiring in the circuit structure are reduced, and the layout complexity of the circuit is reduced.

The two display systems provided in the present application are explained below.

Figure 7:
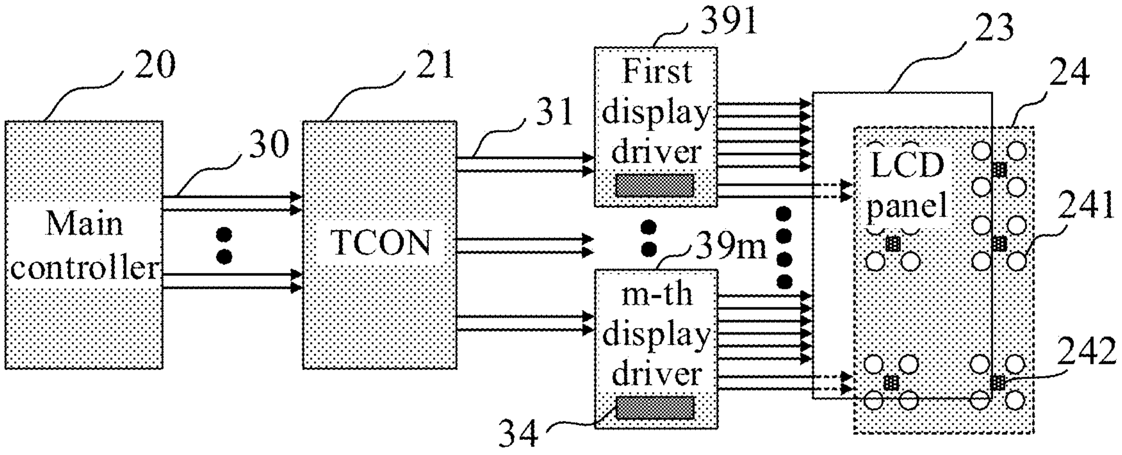
FIG. 7 is a schematic diagram of a structure of a display system provided by the present application according to an exemplary embodiment.
Figure 8:
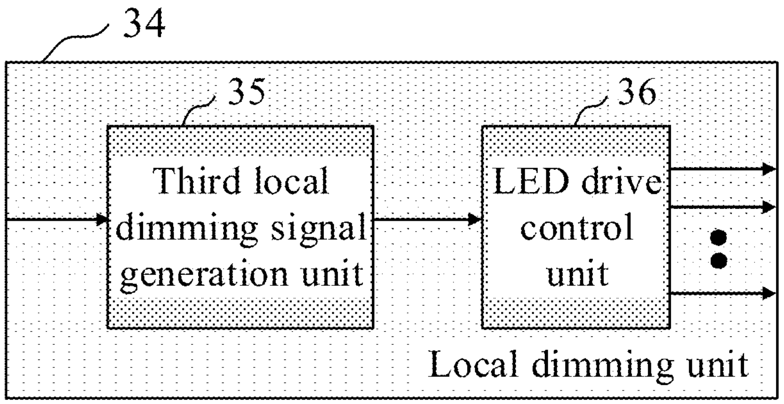
FIG. 8 is a schematic diagram of a structure of a local dimming unit provided by the present application according to an exemplary embodiment.

FIG. 7 is a schematic diagram of a structure of a display system provided by the present application according to an exemplary embodiment, the display system includes a main controller 20, an LCD panel 23, a backlight circuit 24 and a driving system. The driving system includes a TCON 21 and m display drivers, where m display drivers are respectively: a first display driver 391, a second display driver 392, . . . and an m-th display driver 39*m* respectively. Each display driver includes a local dimming unit 34. The structure of the local dimming unit 34 is shown in FIG. 8, and includes a third region dimming signal generation unit 35 and an LED drive control unit 36. Here, the third local dimming signal generation unit 35 is configured for generating a backlight brightness signal according to video data, and the LED drive control unit 36 is configured for generating an LED drive control signal according to the backlight brightness signal.

The main controller 20 is connected with the TCON 21 via a video data transmission line 30, and the TCON 21 is connected with each display driver respectively. In the local dimming unit 34 in each display driver, the third local dimming signal generation unit 35 is connected with LED drive control unit 36. Each display driver includes a plurality of LCD drive signal output terminals and a plurality of LED drive control terminals, each LCD drive signal output terminal is connected with the LCD panel 23, and the LED drive control terminal of each display driver is connected with a corresponding backlight unit in the backlight circuit 24. Here, the number of backlight units is the same as the number of display drivers in the driving system.

Figure 10:
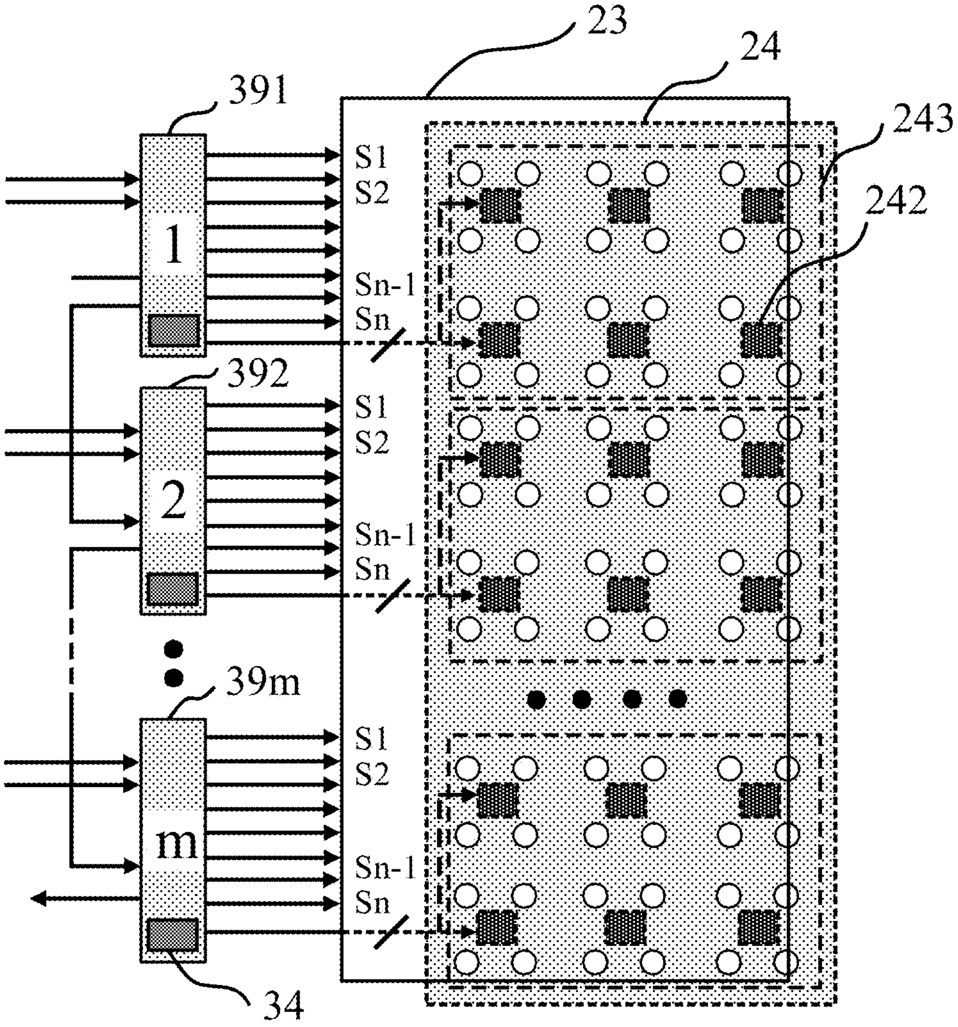
FIG. 10 is a schematic diagram illustrating connection relationships between a plurality of display drivers, an LCD panel, and a backlight circuit provided by the present application according to an exemplary embodiment.

More specifically, the LCD panel 23 is divided into m LCD regions along a horizontal direction of the LCD panel 23, and the backlight circuit 24 is divided into m backlight units 243 along the horizontal direction of the backlight circuit 24, with each LCD region corresponding one-to-one with each backlight unit 243. One display driver connects and drives one LCD region, and also connects and drives a backlight unit 243 corresponding to the one LCD region. The connection relationships between the LCD panel 23, the backlight circuit 24, and each display driver are shown in FIG. 10. The LCD driver signal output interface 244 of each display driver includes n LCD drive signal output terminals. The n LCD drive signal output terminals are connected to one LCD region, and the LED drive control terminals are connected to one backlight unit 243. Moreover, the number of LED drive control terminals in the display driver is the same as the number of groups of cascaded LED drivers in each backlight unit 243. As shown in FIG. 10, the first display driver 391 has two LED drive control terminals, and the backlight unit 243 driven by the first display driver 391 includes two groups of cascaded LED drivers 242, with each group of cascaded LED drivers including three LED drivers. Each LED drive control terminal is connected correspondingly to the two groups of cascaded LED drivers 242 to drive the upper and lower rows of LEDs 241 connected to each group of cascaded LED drivers 242. Here, the drive signals for each group of cascaded LED drivers are transmitted sequentially from left to right. It should be noted that in the traditional display systems shown in FIGS. 2 and 5, the backlight brightness signals generated by the first local dimming signal generation unit 201 and the second local dimming signal generation unit 211 control the illumination of the entire backlight circuit 24, and the control signals generated by the LED controller 25 are also control signals for the entire backlight circuit 24. While, in the display system proposed in the present application, within the local dimming unit 34 of each display driver, the backlight brightness signal generated by the third local dimming signal generation unit 35 is only for one backlight unit 243. Correspondingly, the control signal generated by the LED drive control unit 36 based on the backlight brightness signal is also only for the LED drivers 242 within one backlight unit 243. Therefore, when there are m display drivers in the display system, the size of each local dimming unit 34 is 1/m of the size of the LED controller 25 and the first local dimming signal generation unit 201 shown in FIG. 2, or the size of each local dimming unit 34 is 1/m of the size of the LED controller 25 and the second local dimming signal generation unit 211 shown in FIG. 5. Thus, when integrating the local dimming units 34 into the original display drivers, the adjustment to the size of the original display drivers is relatively small, resulting in low adjustment costs.

Figure 9:
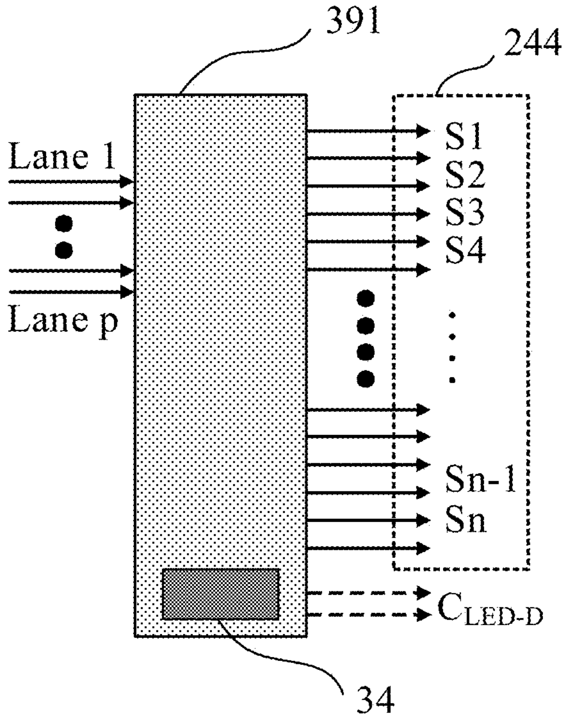
FIG. 9 is a schematic diagram of a structure of a first display driver provided by the present application according to an exemplary embodiment.

More specifically, taking the first display driver 391 as an example, a comparison is made with the structure of the original display driver shown in FIG. 3. The schematic structure of the first display driver 391 is shown in FIG. 9. Compared to the structure of the original display driver, the local dimming unit 34 is added in the first display driver 391, and correspondingly, the LED drive control interface CLED-D is added in the first display driver 391, which includes a plurality of LED drive control terminals for outputting serial signals. The input signal ports lane 1 to lane p, the lock cascade signal input terminal Lin, the lock flag output terminal Lout, and the LCD drive signal output terminal 244 of the first display driver 391 remain unchanged, where the ports lane 1 to lane p are configured to receive display data packets sent by TCON 21. Since one LED 241 can provide illumination for a plurality of pixel dots in the LCD panel 23, and two columns of LEDs 241 only need one group of cascaded LED drivers 242 placed between the two columns of LEDs 241 for driving, and one group of cascaded LED drivers 242 only needs to connect to one LED drive control terminal to obtain the control signal, in one display driver, the number of LED drive control terminals is much smaller than the number of LCD drive signal output terminals. Therefore, integrating the local dimming unit into the display driver results in a relatively small adjustment to the size of the existing display driver.

For example, in a display system, the relationships among different resolutions, the number of display drivers, the number of horizontal pixel dots, the number of vertical pixel dots, the number of horizontal regions, the number of vertical regions, the total number of regions, and the number of LED drive control terminals are shown in Table 1.

TABLE 1

| | Number of display drivers | Number of horizontal pixel dots | Number of vertical pixel dots | Number of horizontal regions | Number of vertical regions | Total number of regions | Number of LED drive control terminals |
|---|---|---|---|---|---|---|---|
| FHD | 4 | 1920 | 1080 | 48 | 36 | 1728 | 24 |
| UHD | 6 | 3840 | 2160 | 60 | 48 | 2880 | 30 |

The relationship, corresponding to the unit display driver, among the number of horizontal pixel dots, the number of vertical pixel dots, the number of horizontal regions, the number of vertical regions, the total number of regions, and the number of LED drive control terminals is shown in Table 2, according to Table 1.

TABLE 2

| | Number of display drivers | Number of horizontal pixel dots | Number of vertical pixel dots | Number of horizontal regions | Number of vertical regions | Total number of regions | Number of LED drive control terminals |
|---|---|---|---|---|---|---|---|
| FHD | 1 | 480 | 1080 | 12 | 36 | 432 | 6 |
| UHD | 1 | 640 | 2160 | 10 | 48 | 480 | 5 |

In traditional display systems, the number of LED drive control terminals of the LED controller 25 is the same as the number of groups of all cascaded LEDs in the backlight circuit 24. However, in the display system proposed in the present application, m display drivers are included, and the number of LED drive terminals set for each display driver is only 1/m of the number of drive control terminals of the LED controller 25, which is much smaller than the number of LCD drive signal output terminals. Therefore, the addition of the local dimming unit in the display driver does not affect the size of the display driver. It only requires corresponding adjustments to the number of internal logic circuits and external pins. Thus, the production cost of the display driver is the same as that of the original display driver.

During the operation of the display system, the main controller 20 transmits video data and configuration data to TCON 21, which generates a first display data packet based on the obtained data and transmits the first display data packet to each display driver. The local dimming signal generation unit in each display driver generates the corresponding backlight brightness signal based on the first display data packet, and the LED drive control unit in each display driver generates the corresponding multiple LED drive control signals based on the backlight brightness signal.

More specifically, the first display data packet includes video data and configuration parameters. In an embodiment, if the video data is RGB data, the structure of the first display data packet is as shown in Table 3.

TABLE 3

| Header | Configuration parameter 1 | . . . | Configuration parameter N | First RGB data | . . . | M-th RGB data | End |
|---|---|---|---|---|---|---|---|

The display driver can directly determine the processing method of the display driver based on the configuration parameters in the first display data packet, eliminating the need to receive these configuration parameters via other interfaces, thereby reducing the circuit connection lines in the driving system. The dimming signal generation unit in the display driver generates a corresponding backlight brightness signal based on the video data in the first display data, and the LED drive control unit in the display driver generates a corresponding LED drive signal based on the backlight brightness signal. Furthermore, after each display driver obtains the first display data packet, a display signal processing unit of the display driver converts the video data in the first display data packet into LCD drive signals.

Each display driver outputs the LED drive control signals via its LED drive control terminals to the cascaded LED drivers in the corresponding backlight unit to drive the LEDs connected to the LED drivers to emit corresponding light. Each display driver outputs the LCD drive signal via the LCD drive signal output terminal to the LCD panel to drive the LCD panel to display the corresponding image.

During the above operation, the driving system can still generate drive signals for the LCD panel and the backlight unit based on the remaining components without utilizing the LED controller, ensuring the normal operation of the system while simplifying the system. Additionally, the data transmission path from obtaining video data and configuration parameters from the driving system to generating driving signals for the LCD panel and the backlight unit is the same, resolving the issue of signal desynchronization in traditional display systems when generating driving signals for the LCD panel and the backlight unit.

Figure 11:
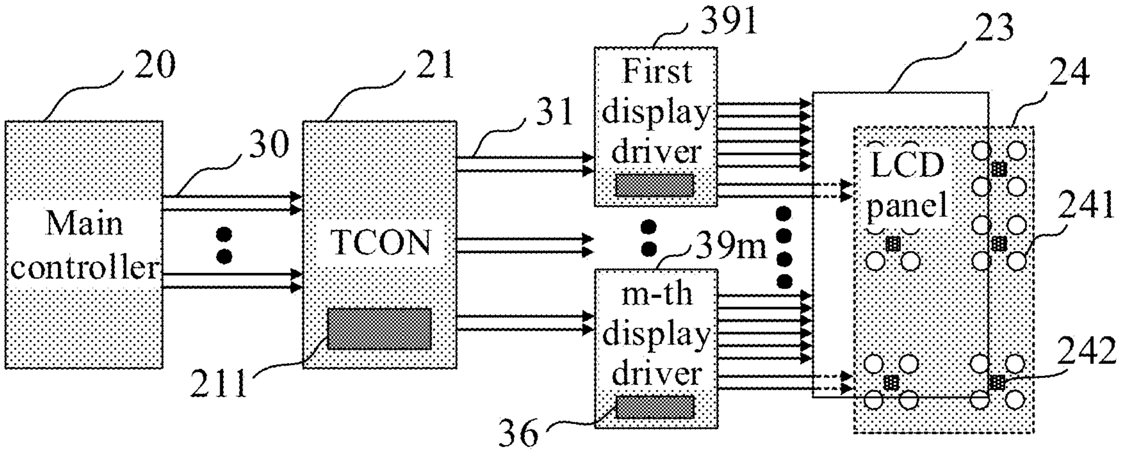
FIG. 11 is a schematic diagram of a structure of a display system provided by the present application according to another exemplary embodiment.

FIG. 11 is a schematic diagram of a display system provided by the present application according to another exemplary embodiment. Compared to FIG. 7, the driving system shown in FIG. 11 includes only the LED drive control unit 36 within the display driver, and a second local dimming signal generation unit 211 is added in the TCON 21. The other components and circuit connection relationships remain the same. After the main controller 20 transmits the video data and configuration parameters of each display driver to TCON 21, TCON 21 first controls the local dimming signal generation unit 35 to generate the corresponding backlight brightness signal based on the video data, and then generates a second display data packet based on the backlight brightness signal, video data, and configuration parameters. After TCON 21 transmits the second display data packet to each display driver, the LED drive control unit 36 in each display driver obtains the backlight brightness signal from the second display data packet and generates the corresponding LED drive control signal based on the backlight brightness signal.

More specifically, the second display data packet includes the backlight brightness signal, video data, and configuration parameters of each display driver. After receiving the second display data, the display driver determines the processing method of the display driver based on the configuration parameters, and the LED drive control unit 36 in the display driver generates the corresponding LED drive signal based on the backlight brightness signal.

In an embodiment, if the video data is RGB data, a structure of the second display data packet is as shown in Table 4, where N, M, and K are all positive integers.

TABLE 4

| Header | Configuration parameter 1 | . . . | Configuration parameter N | First RGB data | . . . | M-th RGB data | First backlight brightness signal | . . . | K-th backlight brightness signal | End |
|---|---|---|---|---|---|---|---|---|---|---|

The driving system shown in FIG. 11 operates in such a way that the second local dimming signal generation unit 211 in the TCON 21 generates the backlight brightness signals for controlling the entire backlight circuit 24 based on the video data sent by the main controller 20. This TCON 21 has the same structure and function as the TCON 21 in the traditional display system shown in FIG. 5. Furthermore, in the driving system shown in FIG. 11, after the TCON 21 sends the backlight brightness signal to each display driver, each display driver only processes the backlight brightness signal required for one backlight unit and generates a corresponding control signal to control the LED drivers 242 in that backlight unit to drive the associated LEDs to emit light. The amount of data for the control signal is only 1/m of the amount of data for the control signal generated by the LED controller 25 in the traditional display system shown in FIG. 5. Comparatively, the number of LED drive control terminals set for each display driver in FIG. 11 is only 1/m of the number of LED drive control terminals of the LED controller 25 in FIG. 5. Therefore, integrating the LED drive control unit 36 into the display driver does not increase the production cost of the display driver.

The process by which the display driver in FIG. 11 drives the LCD display and backlight unit is the same as the driving process in the display system shown in FIG. 7, and will not be elaborated here.

In the display system shown in FIG. 11, the driving system can also drive the LCD display and backlight circuit to operate after removing the LED controller, without changing the connection relationship between the unchanged main controller and TCON, thus reducing the complexity of the circuit layout with a smaller system adjustment cost, and consequently lowering the production cost of the display system. Additionally, the simplified circuit structure reduces the workload of debugging personnel and improves the installation efficiency of the display system.

Figure 12A:
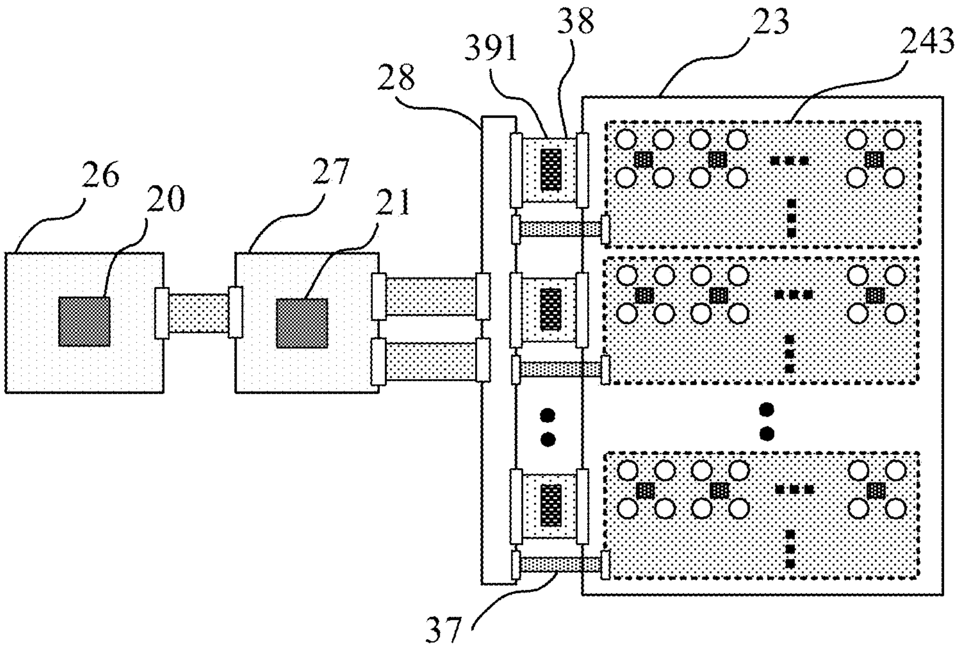
FIG. 12A is a circuit diagram of a display system provided by the present application according to an exemplary embodiment.
Figure 12B:
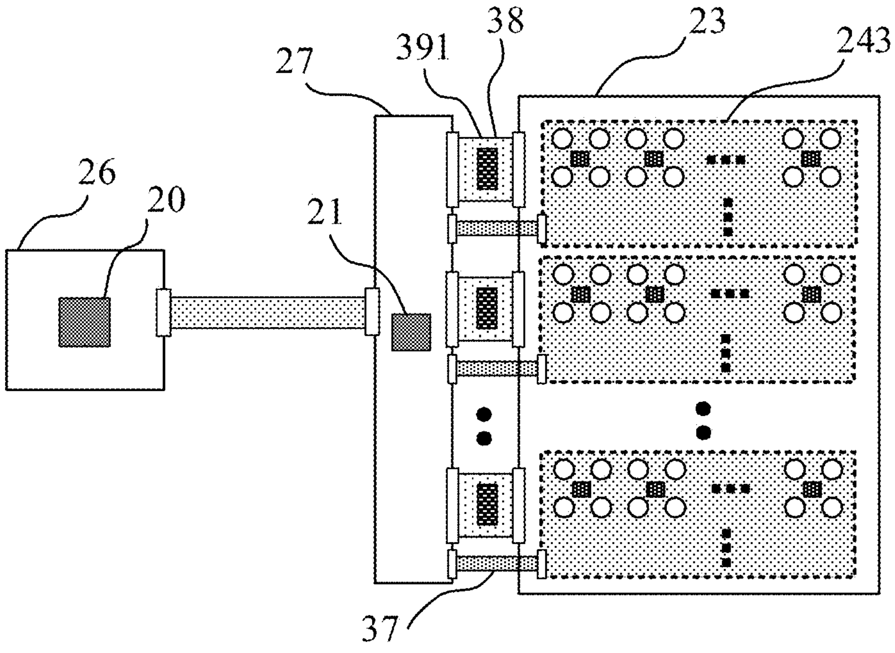
FIG. 12B is another circuit diagram of a display system provided by the present application according to an exemplary embodiment.

The display systems corresponding to FIGS. 7 and 11 can be applied to the following two circuit structures, specifically as shown in FIGS. 12A and 12B.

Figure 13:
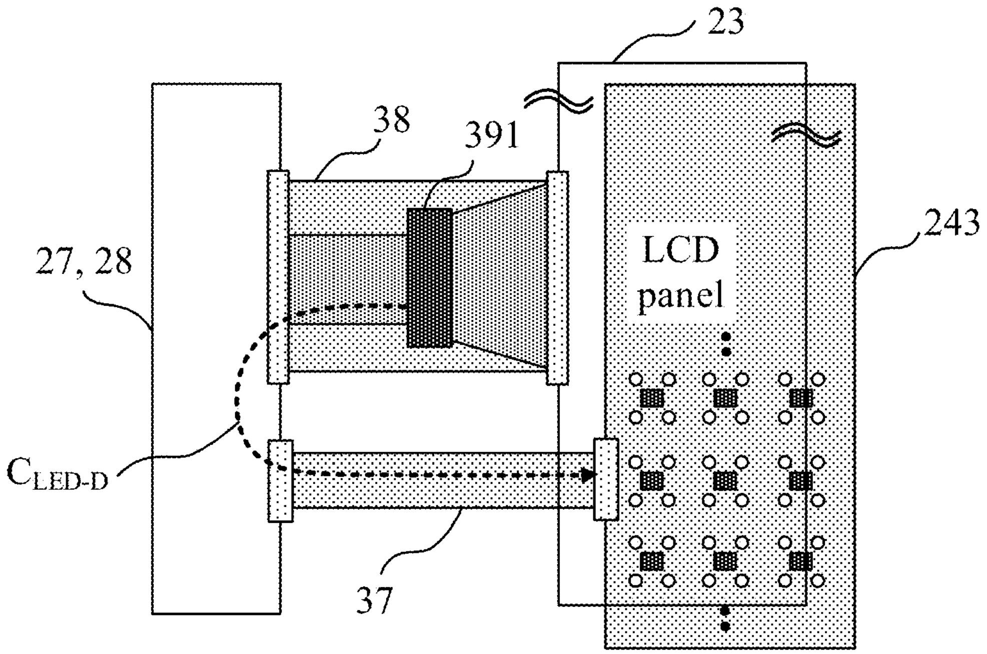
FIG. 13 is a schematic diagram of a driving process of the first display driver provided by the present application according to an exemplary embodiment.

Compared to FIG. 6A, in FIG. 12A, the LED controller 25, LED control board 29, and all flat cables connected to the LED control board 29 are removed. On this basis, in the circuit structure shown in FIG. 12A, at least one flexible circuit board for serial transmission 37, with one end of each flexible circuit board for serial transmission 37 connected to the source board 28 and the other end connected to the corresponding backlight unit 243. The number of display drivers is the same as the number of flexible display drive boards 38 and the number of flexible circuit boards for serial transmission 37. Taking the first display driver 391 as an example, the process of the display driver transmitting the LED drive control signal to the corresponding backlight unit 243 is described, as shown in FIG. 13. The LED drive control signal output from the LED drive control terminal of the display driver is transmitted to the corresponding cascaded LED drivers through the source board and the flexible circuit board for serial transmission 37. This process shortens the information transmission path compared to the traditional display system where the signal is transmitted from the LED control board to the backlight unit via wiring, preventing signal attenuation.

The changes in FIG. 12B compared to FIG. 6B are the same as those in FIG. 12A compared to FIG. 6A, and will not be elaborated upon here. In FIG. 12B, when each display driver transmits the LED drive control signal to the corresponding backlight unit, the LED drive control signal output from the LED drive control terminal of each display driver is transmitted to the corresponding cascaded LED drivers through the timing control board and the flexible circuit board for serial transmission, achieving a minimized transmission path and preventing signal attenuation.

In both of the above circuit structures, not only are the number of individual circuit boards and chips reduced, but the number of wiring in the circuit is also reduced, thereby lowering the layout complexity of the circuit structure of the display system. Furthermore, the existing circuit boards and chips in the circuit structure do not undergo replacement operations, reducing the configuration cost of the circuit.

The present application provides a display device, including the display system corresponding to the embodiment shown in FIG. 7, or the display system corresponding to the embodiment shown in FIG. 11.

Other embodiments of the present application will be apparent to those skilled in the art from consideration of the description and practice of the invention disclosed herein. The present application is intended to cover any modifications, uses or adaptive changes of the present application, which follow the general principles of the present application and include common knowledge or customary technical means in the technical field that are not disclosed in this application. It is intended that the description and examples be considered as exemplary only, with a true scope and spirit of the invention being indicated by the appended claims.

It should be understood that the present application is not limited to the exact construction that has been described above and shown in the drawings, and that various modifications and changes may be made without departing from the scope thereof. The scope of the present application is limited only by the appended claims.

What is claimed is:

1. A driving system, comprising a timing controller and a plurality of display drivers; wherein the timing controller is connected to each of the plurality of display drivers respectively;

each of the plurality of display drivers comprises a local dimming signal generation circuit and an LED drive control circuit; wherein the local dimming signal generation circuit comprises a first processor, and the LED drive control circuit comprises a second processor; and after the timing controller transmits a first display data packet to each of the plurality of display drivers, the first processor of the local dimming signal generation circuit in each of the plurality of display drivers is configured to generate a corresponding backlight brightness signal according to the first display data packet, and the second processor of the LED drive control circuit in each of the plurality of display drivers is configured to generate a plurality of corresponding LED drive control signals according to the backlight brightness signal;

wherein the first display data packet comprises video data and configuration parameters of each of the plurality of display drivers; the display driver determines a processing mode of the display driver according to the configuration parameters of the display driver; the first processor of the local dimming signal generation circuit in the display driver is configured to generate the corresponding backlight brightness signal according to the video data; and the second processor of the LED drive control circuit in the display driver is configured to generate the corresponding LED drive control signals according to the backlight brightness signal.

2. The driving system according to claim 1, wherein each of the plurality of display drivers comprises a plurality of LED drive control terminals, and each of the plurality of LED drive control terminals outputs a corresponding one of the plurality of corresponding LED drive control signals.

3. A display system, comprising a main controller, an LCD panel, a backlight circuit and the driving system according to claim 1;

wherein the main controller is connected to the timing controller of the driving system, each LED drive control terminal of the display driver is connected to the backlight circuit, and an LCD drive signal output terminal of the display driver is connected to the LCD panel.

4. The display system according to claim 3, wherein the backlight circuit comprises a plurality of backlight units, and a quantity of backlight units is the same as a quantity of display drivers in the driving system.

5. The display system according to claim 4, wherein each of the plurality of backlight units comprises a plurality of groups of cascaded LED drivers, and a quantity of LED drive control terminals in each of the plurality of display drivers is the same as a quantity of groups of cascaded LED drivers in each backlight unit.

6. The display system according to claim 3, wherein the display system further comprises a main control board, a timing control board, a source board, at least one flexible display drive board, at least one flexible circuit board for serial transmission and a plurality of flat cables;

the timing controller is connected to the timing control board, and the main controller is connected to the main control board;

the LCD panel comprises a plurality of LCD drive signal input interfaces;

each of the at least one flexible display drive board is connected to one of the display drivers; and the main control board is connected to the timing control board through the flat cable, the timing control board is connected to the source board through the flat cable, the source board is connected to corresponding cascaded LED drivers through each of the at least one flexible circuit board for serial transmission, the source board is connected to each of the at least one flexible display drive board, and each of the at least one flexible display drive board is connected to a corresponding LCD drive signal input interface;

wherein a quantity of display drivers is the same as a quantity of flexible display drive boards, and is the same as a quantity of flexible circuit boards for serial transmission.

7. The display system according to claim 6, wherein an LED drive control signal output from the LED drive control terminal of each of the display drivers is transmitted to the corresponding cascaded LED drivers through the source board and the flexible circuit board for serial transmission.

8. The display system according to claim 3, wherein the display system further comprises a main control board, a timing control board, at least one flexible display drive board, at least one flexible circuit board for serial transmission and a plurality of flat cables;

the timing controller is connected to the timing control board, and the main controller is connected to the main control board;

the LCD panel comprises a plurality of LCD drive signal input interfaces;

each of the at least one flexible display drive board is connected to one of the display drivers;

the main control board is connected to the timing control board through the flat cable, the timing control board is connected to corresponding cascaded LED drivers through each of the at least one flexible circuit board for serial transmission, the timing control board is connected to each of the at least one flexible display drive board, and each of the at least one flexible display drive board is connected to a corresponding LCD drive signal input interface;

wherein a quantity of display drivers is the same as a quantity of flexible display drive boards, and is the same as a quantity of flexible circuit boards for serial transmission.

9. The display system according to claim 8, wherein an LED drive control signal output from the LED drive control terminal of each of the display drivers is transmitted to the corresponding cascaded LED drivers through the timing control board and the flexible circuit board for serial transmission.

10. A display device, comprising the display system according to claim 3.

11. A driving system, comprising: a timing controller and a plurality of display drivers, wherein the timing controller is connected to each of the plurality of display drivers respectively;

each of the plurality of display drivers comprises an LED drive control circuit;

the timing controller comprises a local dimming signal generation circuit;

wherein the local dimming signal generation circuit comprises a first processor, and the LED drive control circuit comprises a second processor;

after the timing controller transmits a second display data packet comprising a plurality of backlight brightness signals to each of the plurality of display drivers, the second processor of the LED drive control circuit in each of the plurality of display drivers is configured to obtain a backlight brightness signal from the second display data packet and generate a corresponding LED drive control signal according to the backlight brightness signal;

wherein the second display data packet further comprises video data and configuration parameters of each of the plurality of display drivers; each of the plurality of display drivers determines its processing mode according to the configuration parameters.

12. A display system, comprising a main controller, an LCD panel, a backlight circuit and a driving system according to claim 11;

wherein the main controller is connected to the timing controller of the driving system, the plurality of display drivers are connected to the backlight circuit, and the plurality of display drivers are connected to the LCD panel.

13. A display device, comprising the display system according to claim 12.

* * * * *